United States Patent [19]
Driskell

[11] 3,992,718
[45] Nov. 16, 1976

[54] COLOR PANORAMIC LASER PROJECTOR
[75] Inventor: Carl R. Driskell, Winter Park, Fla.
[73] Assignee: The United States of America as represented by the Secretary of the Navy, Washington, D.C.
[22] Filed: Jan. 23, 1975
[21] Appl. No.: 543,594

[52] U.S. Cl. .................................. 358/61; 178/7.6; 178/6.8
[51] Int. Cl.$^2$ ...................... H04N 3/08; H04N 9/14
[58] Field of Search ................... 358/60, 61, 63, 64, 358/56; 178/6, 6.8, 7.3 D, 7.5 D, 7.88, DIG. 38, DIG. 35, 6.5, 7.6

[56] References Cited
UNITED STATES PATENTS

| | | | |
|---|---|---|---|
| 2,971,054 | 2/1961 | Holt | 178/7.6 |
| 3,006,994 | 10/1961 | Spiegel | 178/7.2 |
| 3,320,359 | 5/1967 | Ikegami | 178/6 |
| 3,383,460 | 5/1968 | Pritchard | 358/61 |
| 3,569,616 | 3/1971 | Baker | 178/7.6 |
| 3,624,284 | 11/1971 | Russell | 178/7.6 |
| 3,692,934 | 9/1972 | Herndon | 178/7.5 D |

*Primary Examiner*—John C. Martin
*Attorney, Agent, or Firm*—R. S. Sciascia; D. D. Doty

[57] ABSTRACT

For connection to a color television capable of producing red, blue and green video signals representative of a real time 360° scene, a 360° color panoramic laser projection system wherein the outputs of red, blue and green lasers are modulated from the respective red, blue and green video output signals through a modulator system in order that the laser beams will carry the video information of the pickup video signals but at a greater visual intensity, together with a reflector mixer system to combine said laser outputs to a common beam and a 360° scan, reflector and display screen system moving said common beam continuously through 360° and in vertical scan to provide a reproduction of the original television pickup scene on a 360° display screen.

6 Claims, 2 Drawing Figures

COLOR PANORAMIC LASER PROJECTOR

BACKGROUND OF THE INVENTION

The invention is in the field of simulation and display systems and in particular relates to a color panoramic laser projector system.

In many simulation applications it is desirable to provide a wide angled, unprogrammed, color visual display.

In this respect, it is well known to utilize spherical or hyperboloidal reflecting optics to provide the vehicle whereby a 360° real time display of an area or scene may be projected. It is also known to utilize a similar arrangement in a television pickup system and a television monitor and display system to provide an unprogrammed display in real time either in black and white or in color. It is further known to provide a color television receiver pickup system to provide video signals of red, blue and green channels for modulating respective red, blue and green lasers, the modulated output of the lasers being then applied through horizontal and vertical beam scan means to provide a modulated color scan of a display screen to reproduce on the screen a color image.

However, to the best of applicant's knowledge the art has not been developed to provide a 360° unprogrammed color display in real time. Such an apparatus would be of particular importance in providing realism in both military and entertainment displays, in the operation of such military equipment as ships, tanks and planes, and in the provision of simulation equipment for the training of personnel in the operation of such equipment.

SUMMARY OF THE INVENTION

Under this invention I provide in addition to separate lasers for producing red, blue and green laser beams and modulator means for modulating the laser beams from sources of video signals representing red, blue and green image pickup, also a reflector mixer system of three reflectors positioned to receive and combine the modulated output laser signals into a single composite video modulated laser beam and a scan means including a motor driven, oscillating reflector positioned to redirect said combined laser beam to a 360° reflector surface and thence to a 360° screen having a common point of generation with said reflector to provide thereby a 360° color laser projected image of improved quality and without the need of a television monitor tube.

DESCRIPTION OF THE PREFERRED EMBODIMENT

Figure 1:
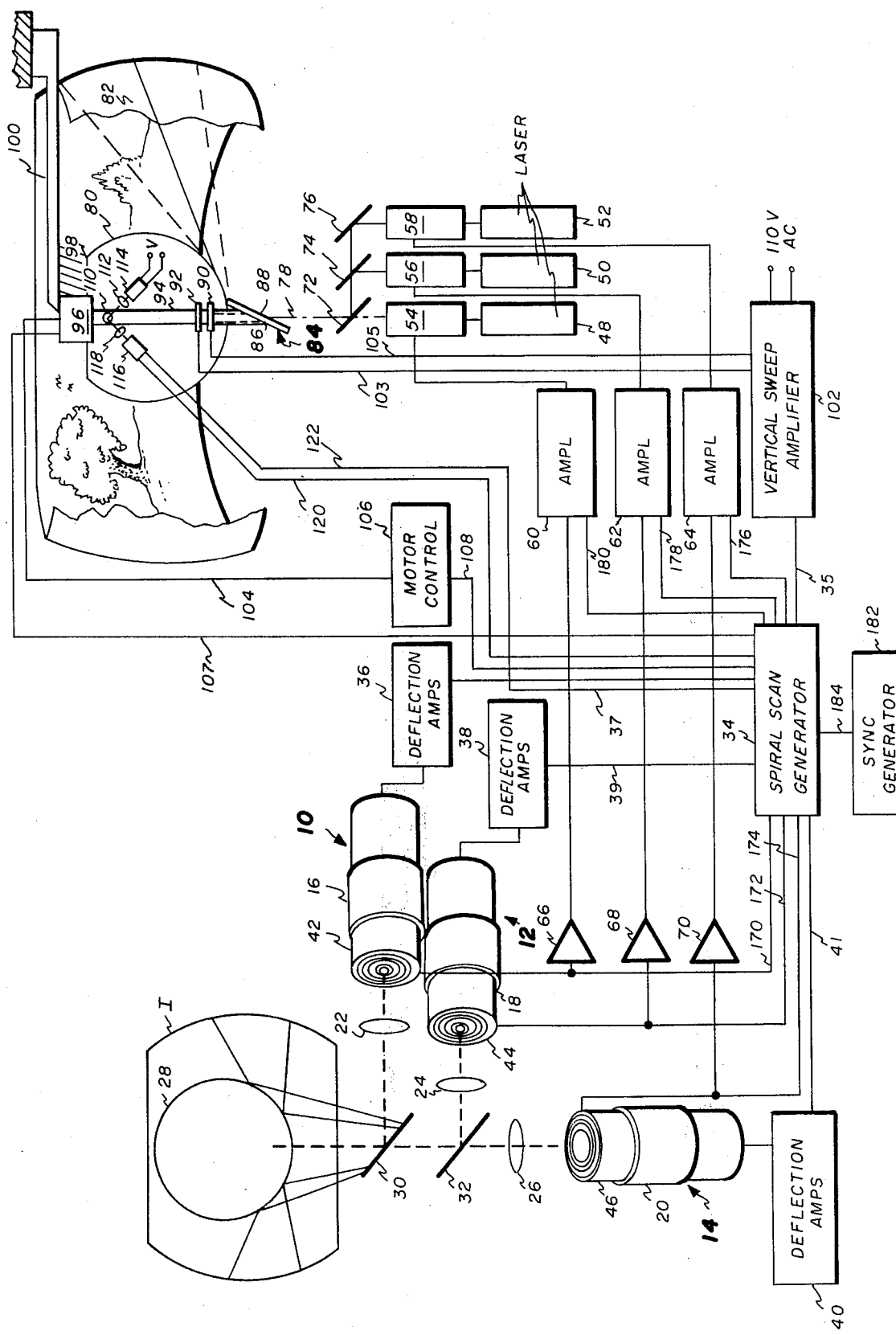
FIG. 1 is a diagrammatic view of a color panoramic laser projection and display system incorporating the invention and coupled to a suitable television pickup system, for providing the image video signal to the projector system.

Referring to FIG. 1, there is shown a compatible combination of television pickup assembly and color panoramic laser projection and display system. Thus, in FIG. 1 is shown electrostatically deflected television pickup tubes 10, 12 and 14 having respectively focus coils 16, 18 and 20 and focus lenses 22, 24 and 26. Also in FIG. 1 is a spherical reflector 28 which reflects a 360° image, indicated at I, through dichroic mirrors 30 and 32.

Thus, the television pickup tubes 10, 12 and 14 view an identical real world or model board image as reflected from the mirrored ball 28 through dichroic mirrors 30 and 32 and lenses 22, 24 and 26. Dichroic mirror 30 reflects all the red elements of the scene through lens 22 to the target area of the television pickup tube 10. All blue elements of the scene pass through dichroic mirror 30 and are reflected from dichroic mirror 32 through lens 24 to the target area of television pickup tube 12. All green elements of the scene pass through dichroic mirrors 30 and 32 and lens 26 to the target area of television tube 14. The lenses 22, 24 and 26 provide the means for focusing the image rays on the target area of the respective pickup tubes. A spiral scan generator 34 is provided to generate the appropriate scan voltage wave forms for a spiral scan on each television pickup tube. The outputs of spiral scan generator 34 are applied through deflection amplifiers 36, 38 and 40 to the respective deflection plates 42, 44 and 46 of pickup tubes 10, 12 and 14. Instead of electrostatically deflected pickup tubes magnetically deflected pickup tubes can be used in which case each magnetically deflected pickup tube is provided with a deflection yoke (not shown) in addition to focus coils 16, 18 and 20, and deflection amplifiers 36, 38 and 40, then pass inputs to the deflection yokes (not shown) instead of the electrostatic deflection plates.

There has been described thus far one television pickup system suitable for combination with the projector display system which incorporates my invention. The projector system itself comprises separate lasers 48, 50 and 52 for providing the basic colors green, blue and red, laser beam modulator means including pockel cells 54, 56 and 58 for respective lasers 48, 50 and 52, together with camera video amplifiers 66, 68 and 70 and display video amplifiers 60, 62 and 64 to drive pockel cells 54, 56 and 58. The pockel cell is conventionally used for controlling the output strength of a laser beam and is referred to as pockel's-effect modulation, a phenomenon that occurs in a transparent dielectric piezoelectric crystal. The crystal tends to strain whenever an electric field is applied, rotating the planes of polarization of the incident wave. Each video chain, consisting of a camera and display video amplifier, is connected between its associated pockel cell and the associated video signal pickup tube to modulate the video signals and output laser beam in direct proportion to the instantaneous light level imaged onto the camera tube. This form of system is fully described in the May 1972 Isomet brochure on "Light Modulators and Modulation Systems." The pockels effect is also described in "Introduction to Modern Optics", pages 192 and 193 of Grant R. Rowles, 1968 edition by Holt, Rinehart and Winston, Inc., New York, N. Y.

The projector system also includes a reflector mixer system of three reflectors 72, 74 and 76 to receive respectively the modulated output laser signals of the respective pockel cells 54, 56 and 58 and angularly positioned, as indicated, to combine the cell outputs to a single mixed color beam 78.

To move the combined beam in azimuth and vertical scan for directing the beam from a 360° reflector 80 to a curved display screen 82, I provide a scan system including a motor driven, piezoelectric excited, deflector 84 having opposite sides 86 and 88 connected electrically to respective slip rings 90 and 92 surrounding a shaft 94 which connects the deflector 84 to a drive motor 96. Thus, the scan includes a deflector 84 having opposite sides 86 and 88 and attached to a hollow drive shaft 94 which is driven from a motor 96. The drive motor and the reflector 80 are supported from any suitable means such as hangers indicated at 98 and 100. The slip rings are energized from a vertical sweep amplifier 102 via lines 103 and 105. The vertical sweep amplifier 102 will be described in detail hereinafter. The motor 96 is connected via a line 104, voltage adjuster and amplifier 106, and a line 108 for energizing and controlling the speed of the motor from the spiral scan generator 34.

In order to provide a feedback of measured r.p.m. (revolutions per minute) to the spiral scan generator, I provide a ground reflector surface sot 10 located on shaft 94, a light source 114 and lens 112 for focusing light on the reflector spot 110 and a light detector 116 and lens 118 for receiving the reflected light and for each turn of the shaft 94 transmitting a pulse signal via lines 120 and 122 to the spiral scan generator 34. The light 114 is supplied from a suitable d.c. voltage source indicated.

Figure 2:
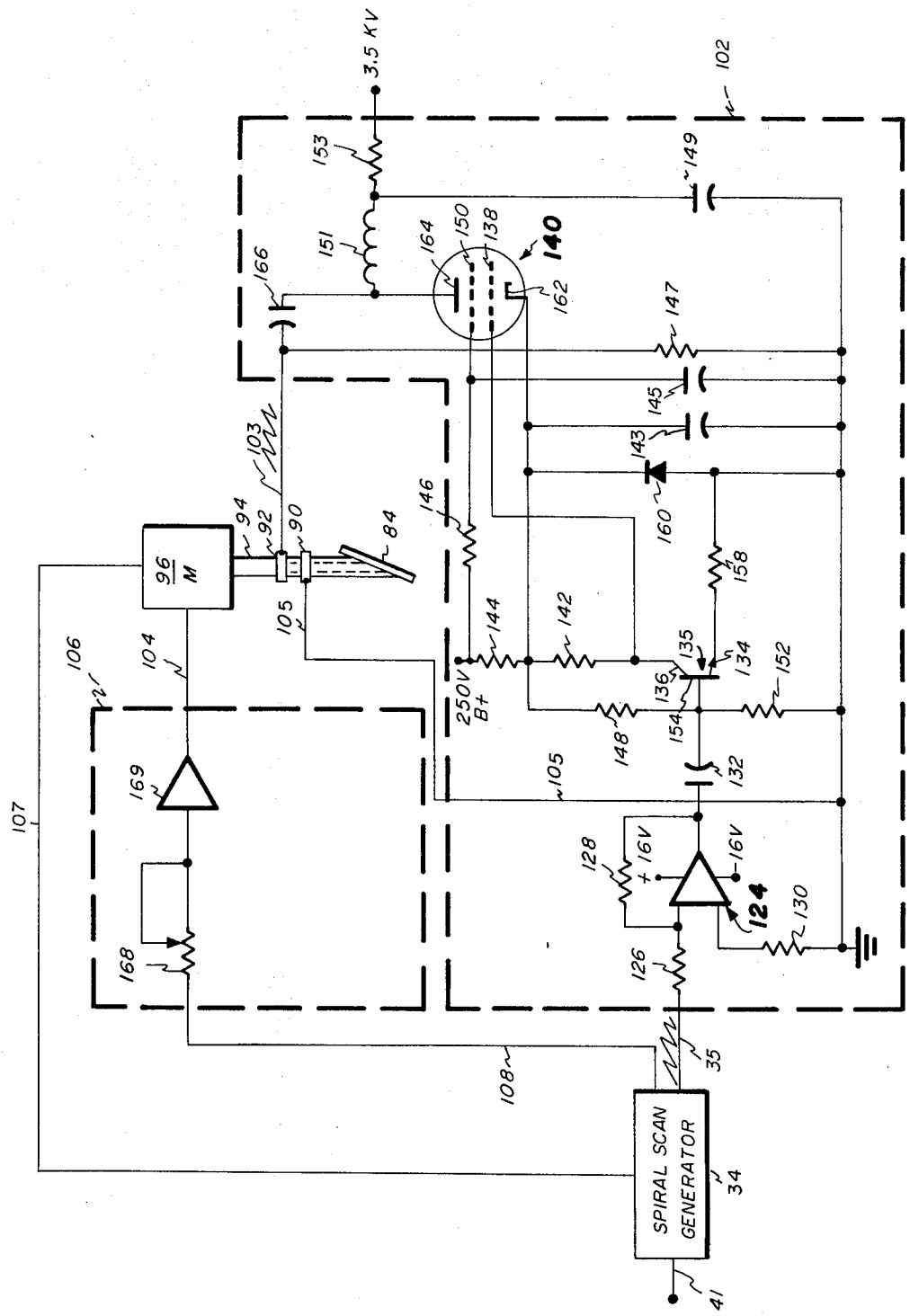
FIG. 2 shows circuit details of a vertical sweep amplifier system and a motor speed adjustment circuit shown in block form in FIG. 1.

The scan system including details of the vertical sweep amplifier 102 is shown in FIG. 2. Thus, the output from the spiral scan generator 34 is passed on line 35 (FIG. 2) as a vertical scan sawtooth wave form and is fed into an operational amplifier 124 through an input resistor 126, the amplifier having positive and negative power supplies indicated and a feedback resistor 128 and ground resistor 130. The amplifier 124 is coupled through a capacitor 132 to a transistor amplifier 134. The collector 136 energizes the control grid 138 of an amplifier 140. A screen control voltage circuit comprised of resistor 146 and capacitor 145 is connected as indicated for maintaining the potential of screen grid 150. A bypass capacitor 143 maintains the bias potential of cathode 162. Resistors 148 and 152 are connected to the base 154 of transistor 135 and to ground to maintain the desired bias voltage for operating transistor 135. A 250 volt power supply supplies collector current to transistor 135 through resistors 142 and 144. Resistor 144 and diode 160 are connected between the 250 volt power supply and ground to provide bias voltage to the cathode 162 of amplifier 140. A 3.5 Kv power supply is connected through resistor 153 and inductor 151 to supply current to plate 164 of amplifier 140. Bypass capacitor 149 is connected between resistor 153 and ground to bypass any transients from the 3.5 Kv power supply. The plate 164 of amplifier 140 is connected through capacitor 166 to load resistor 147 and slip ring 92. The vertical scan signal is returned to ground through the vertical deflection piezoelectric shear cube which is polished and referred to hereinbefore as rotatable deflector 84. Slip ring 90 and line 105 complete the return to ground. In operation, the vertical sweep amplifier 102 provides the necessary voltage amplifier of the vertical scan sawtooth wave output of the spiral scan generator 34 to activate the piezoelectric reflector 84 to produce the desired vertical scan on the screen 82.

Also, shown in FIG. 2 is the deflector drive motor 96 where rotor is excited by a d.c. voltage from the spiral scan generator. This signal passes on line 108 and through adjustable potentiometer 168 and amplifier 169 to input line 104 to provide the capability of adjusting the speed range by sync motor 96. The light 114 (FIG. 1) shaft reflector spot 110 and detector 116 provide a sync signal to spiral scan generator 34 to assure that the pickup tubes 10, 12 and 14 are scanned synchronously with the motor 96.

The spiral scan generator 34 provides each pickup tube 10, 12 and 14 via lines 170, 172 and 174 (FIG. 1) with a modulating signal to maintain a nearly constant picture brightness from top to bottom on display screen 82, the variation of the picture lightness from a constant level being due to the curvature of the screen in the vertical direction. (A complete explanation of the spriral scan generator is described in U.S. Pat. No. 3,006,994 issued Oct. 31, 1961 to Eitel-Fritz Spiegel.) The beam modulation is necessary to avoid a change in picture brightness due to the change in beam scan velocity as the beam traverses larger circles on each pickup tube.

Spiral scan generator 34 provides via lines 176, 178 and 180 to display video amplifiers 64, 62 and 60 a suitable modulating signal to compensate for the vertical curvature of the screen and thereby maintain a constant brightness over the entire display that is independent of the instantaneous location of the vertical scan.

A sync generator 182 is connected via a line 184 to the spiral scan generator to provide the necessary timing pulse inputs.

To minimize distortions the curvature of the reflector 80 (FIG. 1) and screen 82 are generated from a common point.

What is claimed is:
1. A color panoramic laser projector for connection to a color television pickup system, including pickup tubes, capable of supplying red, blue and green video output signals representative of a real time 360° scene comprising:
   a. separate lasers for producing red, blue, and green laser beams;
   b. modulator means for receiving said red, blue, and green video signals to modulate respectively said red, blue, and green laser beams and to control the output values thereof;
   c. a reflector mixer system of three reflectors positioned to receive respectively the modulated red, blue, and green laser output signal from said laser beam modulating means and to combine them as a single mixed color beam;
   d. a 360° display screen;
   e. a 360° reflector centered at the center of generation of said display screen;
   f. scan means for redirecting said signle mixed color beam to said 360° reflector and thence to said 360° display screen; and
   g. said modulator means including separate pockel cells for respectively receiving said red, blue, and green video signas, a camera video amplifier and a display video amplifier connected in series between each pickup tube and its associated pockel cell, and a spiral scan generator connected to provide modulating signals to said camera video amplifiers to produce nearly uniform display brightness by controlling the strength of the laser beam output signals via said respective pockel cells.
2. Apparatus according to claim 1 wherein
   a. said scan means includes
   b. a deflector c. motorized drive means connected to rotate said deflector concentrically about the longitudinal axis of said combined laser beam, and
d. activating means for continuously deflecting said reflector about an axis thereof normal to said combined laser beam to provide vertical scan.

3. Apparatus according to claim 1 wherein
a. said spiral scan generator is connected to supply modulation signals to said display video amplifiers to maintain the video signals to said pockel cells at a constant average level that is independent of the instantaneous level of the vertical scan to minimize the video dynamic response requirements of said camera video and display video amplifiers.

4. Apparatus according to claim 3 wherein
a. said scan means includes
b. a deflector c. motorized drive means connected to rotate said deflector concentrically about the longitudinal axis of said combined laser beam, and
d. activating means for continuously deflecting said combined laser beam to provide vertical scan.

5. Apparatus according to claim 4 wherein
a. said deflector is a piezoelectric element, and
b. said activating means is a vertical sweep amplifier connected to said spiral scan generator and to said piezoelectric element to provide a sawtooth voltage source means for energizing said piezoelectric element at a rate selected for desired rate of vertical scan.

6. Apparatus according to claim 5
a. said 360° display means and said 360° reflector surface being generated from a common point to provide a fixed relative curvature for the screen and reflector surfaces.

* * * * *